US012568062B2

(12) United States Patent
Davis

(10) Patent No.: US 12,568,062 B2
(45) Date of Patent: Mar. 3, 2026

(54) EXPERIENCE DIFFERENTIATION

(71) Applicant: Comcast Cable Communications, LLC, Philadelphia, PA (US)

(72) Inventor: Gregory J. Davis, Barnegat, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 278 days.

(21) Appl. No.: 15/943,909

(22) Filed: Apr. 3, 2018

(65) Prior Publication Data

US 2019/0306110 A1 Oct. 3, 2019

(51) Int. Cl.
| | |
|---|---|
| *G06F 15/16* | (2006.01) |
| *H04L 9/40* | (2022.01) |
| *H04L 61/4511* | (2022.01) |
| *H04L 61/5007* | (2022.01) |

(52) U.S. Cl.
CPC ...... *H04L 61/4511* (2022.05); *H04L 61/5007* (2022.05); *H04L 63/068* (2013.01)

(58) Field of Classification Search
CPC ............. H04L 61/1511; H04L 61/2007; H04L 61/6068; H04L 63/068
See application file for complete search history.

(56) References Cited

U.S. PATENT DOCUMENTS

| | | | | |
|---|---|---|---|---|
| 2002/0010798 A1* | 1/2002 | Ben-Shaul | .............. | H04L 67/52 |
| | | | | 707/E17.116 |
| 2003/0225906 A1* | 12/2003 | Natarajan | ............... | H04L 41/00 |
| | | | | 709/242 |

| | | | | |
|---|---|---|---|---|
| 2010/0010975 A1* | 1/2010 | Morris | ................ | H04L 61/1511 |
| | | | | 707/E17.014 |
| 2010/0125673 A1* | 5/2010 | Richardson | ......... | H04L 67/1001 |
| | | | | 709/239 |
| 2012/0054869 A1* | 3/2012 | Yen | .................... | H04L 29/12066 |
| | | | | 726/24 |
| 2014/0250241 A1* | 9/2014 | Barber | ................ | H04L 61/2007 |
| | | | | 709/245 |
| 2014/0337321 A1* | 11/2014 | Coyote | ............... | G06F 3/04842 |
| | | | | 707/722 |
| 2016/0248813 A1* | 8/2016 | Byrnes | .............. | G06F 16/24578 |
| 2017/0041332 A1* | 2/2017 | Mahjoub | ............. | H04L 43/0876 |
| 2017/0187733 A1* | 6/2017 | Ahn | .................... | H04L 61/4511 |
| 2018/0302400 A1* | 10/2018 | Covdy | ............... | H04L 63/0853 |

* cited by examiner

*Primary Examiner* — Normin Abedin
(74) *Attorney, Agent, or Firm* — Banner & Witcoff, Ltd.

(57) ABSTRACT

Methods and systems are described for differentiating user experience based on domain name system (DNS) queries. An experience differentiating DNS server may respond to user information in a DNS query to selectively deliver a different experience to the client based on the user information. The experience differentiating DNS server may determine a user information subpart of a DNS query and a domain name subpart of the DNS query. The experience differentiating DNS server may determine user supplemental address information based on the user information. The experience differentiating DNS server may determine a partial domain response based on the domain name subpart of the DNS query. The experience differentiating DNS server may determine a DNS response based on the partial domain response and the user supplemental address information. A portion of the DNS query may be encrypted, and the experience differentiating DNS server may decrypt a portion of the DNS query.

21 Claims, 8 Drawing Sheets

EXPERIENCE DIFFERENTIATION

BACKGROUND

Internet protocol (IP) and related technologies facilitate communication between computing devices which communicate via a network. Each computer on a network may be addressable by one or more IP addresses. An IP address uniquely identifies a particular computer communicating via a particular network. Because IP addresses are difficult for people to remember, many networks implement a domain name system (DNS) to translate human-readable words called domain names into numerical IP addresses.

Websites on the Internet and other such network resources may present different information or features to different users based on many factors. A web site may desire to provide one user experience to a first set of users and another user experience to a second set of users; however, this may require specially coding this behavior into the web site, and may not be possible or easy to accomplish.

SUMMARY

The following presents a simplified summary of certain features. This summary is not an extensive overview, and is not intended to identify key or critical elements. The following summary merely introduces certain features in a simplified form as a prelude to the more detailed description.

An experience differentiating DNS server may differentiate user experience based on user information in a DNS query. A client may submit a DNS query to the DNS server to resolve a domain name such as "example.com." In response, the DNS server may return the IP address of a computer associated with the domain name "example.com." User information, such as a username, may be prepended to a DNS query in the format of a subdomain. The DNS query may be encrypted to protect user privacy. The DNS server may receive the DNS query, parse the user information from the requested domain, and determine a suitable response based on the user information and the domain information. Parsing may include determining user supplemental information. The response may direct a requesting client to content selected based on one or more attributes identified in the user information. The response may be a partial domain response and/or may vary based on the DNS zone file retrieved by the DNS server and/or may vary based on an identification of a subnet of a network. The DNS server may provide the response to a requesting client, and the client may use the response to access content intended for the client. Thus, the client may receive differentiated content based on user information associated with the client. Different clients may then receive different responses and different content for the same or similar DNS queries.

These and other features and advantages are described in greater detail below.

BRIEF DESCRIPTION OF THE DRAWINGS

The present disclosure includes examples shown in, but is not limited by, the accompanying drawing in which like numerals indicate similar elements.

DETAILED DESCRIPTION

In the following description, reference is made to the accompanying drawings, which form a part hereof, and in which are shown examples of various features. It is to be understood that other features may be utilized and structural and functional modifications may be made, without departing from the scope of the present disclosure.

Figure 1:
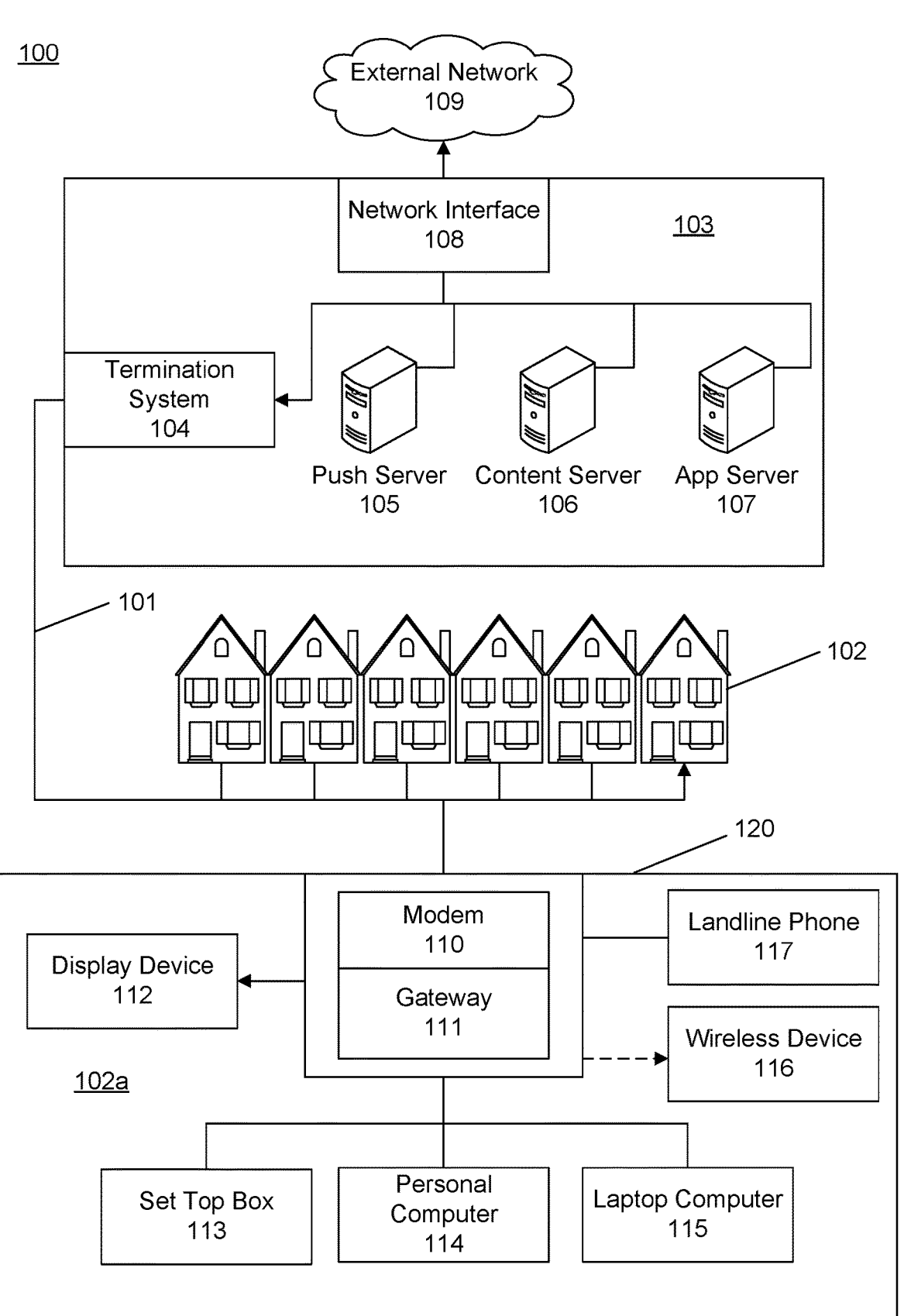
FIG. 1 shows an example communication network.

FIG. 1 shows a communication network 100. Encoded versions of media content items may be sent via the communications network 100 to a premises and reproduced on, for example, one or more user devices located within an example premises 102a. Examples of user devices in the premises 102a include a laptop computer 115, a mobile device (e.g., a smart phone or tablet) 116, a display 112, and a computer 114.

The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or local office 103. The local office 103 may send downstream information signals via the links 101, and each premises 102 may have a receiver used to receive and process those signals.

There may be one link 101 originating from a local office 103, and it may be split a number of times to distribute the signal to various premises 102 in the vicinity (which may be many miles) of the local office 103. The links 101 may include components not shown, such as splitters, filters, amplifiers, etc. to help convey the signal clearly. Portions of the links 101 may comprise fiber-optic cable, while other portions may comprise coaxial cable, other lines, or wireless communication paths.

The local office 103 may include an interface, such as a termination system (TS) 104. More specifically, the interface 104 may be a cable modem termination system (CMTS), which may be one or more computing devices configured to manage communications between devices via the network of links 101 and backend devices such as the servers 105-103. The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies. The local office 103 may also include one or more interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate via the external networks 109, and to other devices connected to the network such as a cellular telephone network and its corresponding cell phones.

The local office 103 may include a variety of servers 105-107 that may be configured to perform various functions. For example, the local office 103 may include a push notification server 105. The push notification server 105 may generate push notifications to deliver data and/or commands to the various premises 102 connected to the network (e.g., to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 103. An application server 103 may be one or more computing devices configured to offer any desired service, and may run various languages and operating systems. For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, the push server 105, content server 106, and application server 103 may be combined. Although the push server 105, content server 106, and application server 103 are shown generally, and it will be understood that they may each contain memory storing computer executable instructions to cause a processor to perform steps described herein and/or memory for storing data. Alternate and/or additional servers may be included in local office 103 or elsewhere in the network 100.

The example premises 102a, such as a home, may include an interface 120. Although only one interface is shown in FIG. 1, a plurality of interfaces may be used. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local WiFi router or access point, or any other desired modem device. Although only one modem is shown in FIG. 1, the interface 120 may comprise a plurality of modems operating in parallel. Further, the interface 120 may include a gateway interface device 111.

The modem 110 may be connected to, or be a part of, the gateway interface device 111. The gateway interface device 111 may be one or more computing devices that communicate with the modem(s) 110 to allow one or more other devices in the premises 102a, to communicate with the local office 103 and other devices beyond the local office 103. The gateway 111 may comprise a set-top box (STB), digital video recorder ("DVR"), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants ("PDA"), etc.), landline phones 117 (e.g., Voice over Internet Protocol—VoIP phones), and any other desired devices. Examples of the local network interfaces may include Multimedia Over Coax Alliance ("MoCA") interfaces, Ethernet interfaces, universal serial bus ("USB") interfaces, wireless interfaces (e.g., IEEE 802.11, IEEE 802.15), analog twisted pair interfaces, Bluetooth interfaces, and others.

Figure 2:
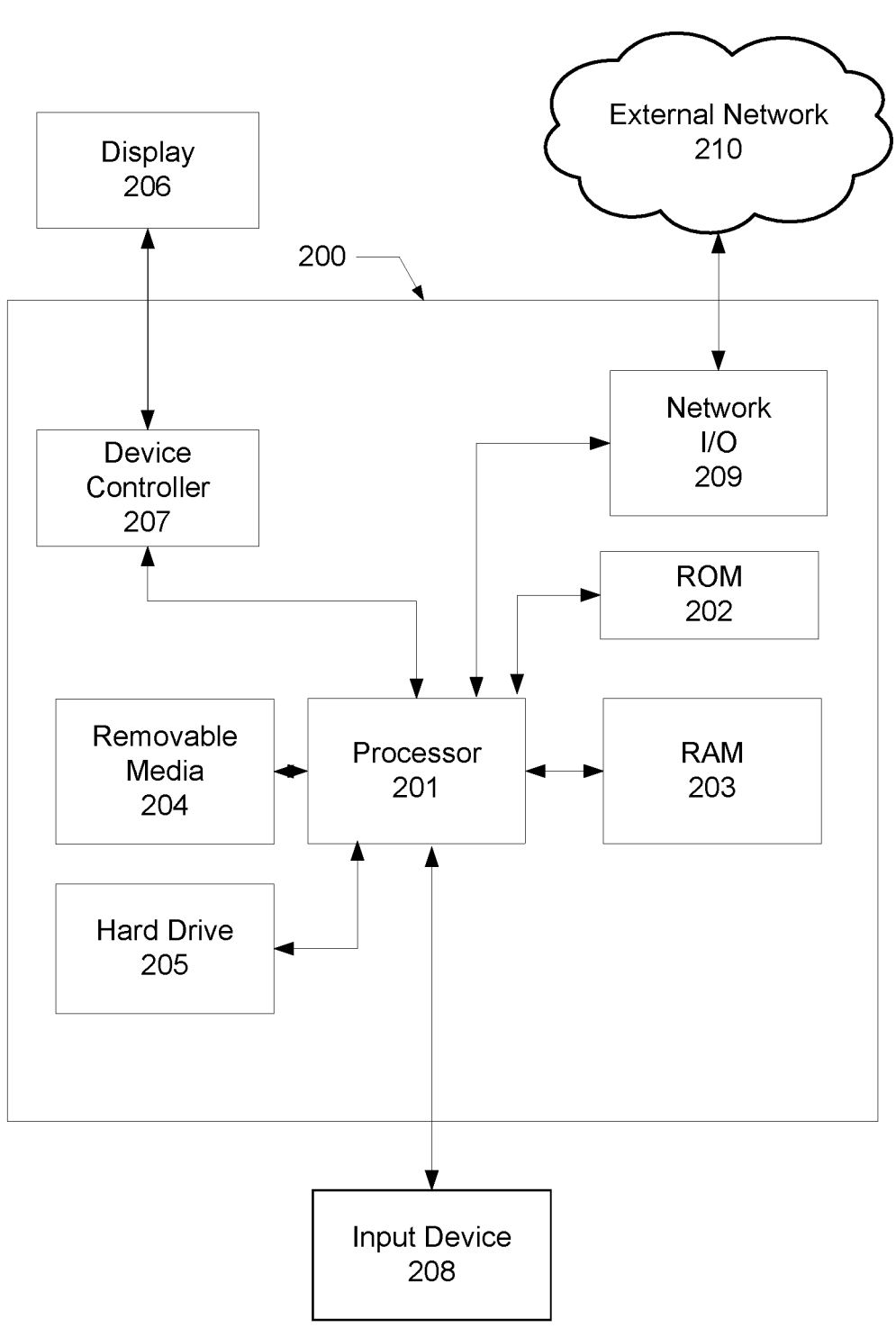
FIG. 2 shows hardware elements of an example computing device.

FIG. 2 is a block diagram showing hardware elements of an example computing device 200. In some examples, a computing device may omit one or more of the elements shown in FIG. 2. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory ("ROM") 202, a random access memory ("RAM") 203, a removable media 204, such as a Universal Serial Bus ("USB") drive, compact disk ("CD") or digital versatile disk ("DVD"), a floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, camera input for user gestures, etc. The computing device 200 may also include one or more network interfaces, such as a network input/output (I/O) circuit 209 (e.g., a network card), which may enable the computing device 200 to communicate via an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although all or portions of the components may be software. Modifications may be made to add, remove, combine, divide, etc. components of the computing device 200 as desired. Additionally or alternatively, the components may comprise basic computing devices and components, and the same components (e.g., processor 201, ROM storage 202, display 206, etc.) may be used to implement any of the other computing devices and components described herein. For example, the various components herein may comprise computing devices having components such as a processor executing computer-executable instructions stored on a computer-readable medium, as shown in FIG. 2. Some or all of the entities described herein may be software based, and may co-exist in a common physical platform (e.g., a requesting entity can be a separate software process and program from a dependent entity, both of which may be executed as software on a common computing device).

One or more features may be embodied in a computer-usable data and/or computer-executable instructions, such as in one or more program modules, executed by one or more computing devices or other devices. Program modules may include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed. In addition, the functionality may be embodied in whole or in part in firmware or hardware equivalents such as integrated circuits and/or field programmable gate arrays ("FPGA"). Particular data structures may be used to more effectively implement one or more features of the disclosure, and such data structures are contemplated within the scope of computer executable instructions and computer-usable data described herein.

Computing devices (e.g., as depicted in FIG. 2) connected to networks (e.g., as depicted in FIG. 1) such as the Internet may be identified by an Internet protocol (IP) address. An IP address consists of a unique numerical identifier for a particular computing resource connected to a network. There are two versions of IP addresses commonly used today. The first is IPv4 and the second is IPv6. IPv4 uses 32-bit addresses and IPv6 uses 128-bit addresses. IPv4 addresses are commonly represented by four groups of base-10 numbers separated by dots, such as "192.0.2.0." IPv6 addresses are commonly represented as eight groups of four hexadecimal digits separated by colons, such as "2001: db8:ffff:ffff:ffff:ffff:ffff:ffff." Examples provided herein may use IPv4 addresses; however, any features or examples described in this disclosure are also compatible with IPv6 or any other similar addressing system.

Many networks use a domain name system (DNS) to act as a sort of phone book for the network. For example, DNS may be widely used on the Internet and private IP networks. DNS translates human readable words called domain names into IP addresses so users need not interact with IP addresses directly. A client may send a request to a DNS server via the DNS protocol to translate a domain name such as "example.com" and in response receive an IP address such as "192.0.2.1" in response. A DNS protocol may be standardized as defined by various Internet Engineering Task Force (IETF) requests for comments (RFC) documents. For example, IETF RFC 1034 and IETF RFC 1035 and related IETF RFC documents contain further technical specifications of the DNS system.

Zone file and resource records (RRs) may be part of a DNS system. A zone file may be a collection of RRs for a subset of the DNS system. Typically, a zone file defines the RRs for a particular domain, such as "example.com." A resource record may be a mapping between a domain name and a particular piece of data. In an example, a RR, as defined by IETF RFC 1035, may contain at least a NAME field, a TYPE field, a Time To Live (TTL) value, and a RDATA field that contains the data associated with the RR. The NAME field may be a fully qualified domain name, such as "subdomain.example.com" or the like. The TYPE field of an RR may indicate the type of data in the RDATA field. The IETF RFC standards define several standard types, but notes that the DNS specification may be extensible beyond these standard types.

For example, one standard TYPE is the "A" record that contains an IPv4 address. For example, the zone file for "example.com" may contain an RR with the NAME "subdomain.example.com" of type "A" with the IPv4 address of "192.0.2.2" in the RDATA field. When a client requests the IP address for "subdomain.example.com" from a DNS server with this zone file, the response may include the IP address in the "A" RR, "192.0.2.2," informing the client to connect to the computing resource at that address to access "subdomain.example.com." In this way, the DNS system translates the human-readable domain name "subdomain.example.com" into an IP address that clients can use to connect to a particular computing resource via a network such as the Internet. If the zone file is altered to contain a different IP address "192.0.2.3" in the "A" record for "subdomain.example.com," clients may connect to a different computing resource at the different IP address. Thus, the DNS system can redirect clients to different computing resources for the same domain name depending on the zone file and RRs that are used.

Different user experiences may be delivered to different users at the same domain. For example, on the Internet, one user experience may be delivered to a first group and a second user experience may be delivered to a second group. One reason may be to comparison test different versions of software, commonly referred to an A/B testing. In A/B testing, user's engagement with differing versions of software are monitored and compared to determine which one to use. For example, a web site may A/B test different layouts or color schemes to determine which one results in users spending more time on a web site. Customized or semi-customized user experiences may be delivered to different audiences. For example, local news customized to a user's geographic location may be delivered to a user such that a user from California receives a different user experience than a user in New York. Different user experiences may be delivered to users based on a service-tier or other business relationship between the user and the service. For example, a website may have users subscribed to a premium tier that receive one user experience while users in a different tier of service receive a pared down user experience. Personal data may be delivered to a user. One way to accomplish this is the common practice of a username and password login procedure. Once a user is logged in by using a unique username and private password, they can receive content specifically tailored and personal to them. For example, it is common to log in to a web site to receive personal data and content, such as an email service accessible via a web site (commonly called webmail).

The above purposes for differentiating user experience may apply to web sites on the Internet. In addition, these same purposes may apply to web services, database access, application programming interface (API) endpoints, streaming media, and other such services and resources accessible via IP networks.

The endpoint may be configured with differentiating functionality. For example, logging in with a username and password is one such way to differentiate user experience from the endpoint. Differentiation may also take place at the DNS level before the client accesses the endpoint. In this way, various endpoint servers need not be customized to include differentiating capabilities. Rather, differentiating user experience at the DNS level allows developers the flexibility to use unmodified endpoints to provide a differentiated user experience.

Figure 3A:
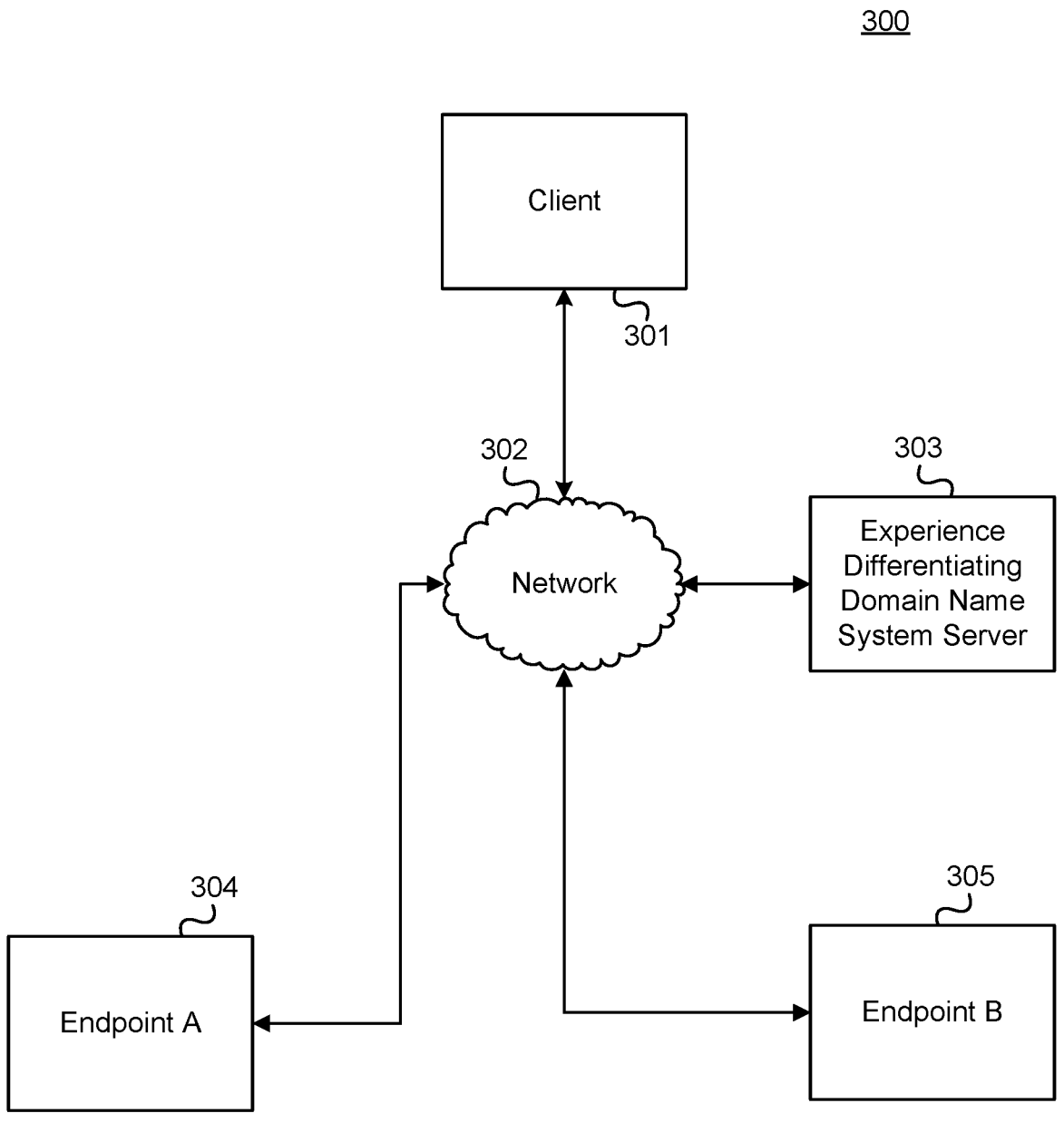
FIG. 3A shows an example experience differentiating domain name system environment.

FIG. 3A shows an example domain name system (DNS) environment. A client 301, a DNS Server 303, an endpoint A 304, and an endpoint B 305 are all in communication via a network 302. For example, the network 302 may be the Internet, a private IP network, or some other IP network. The network 302 may also be a non-IP network that also uses similar addressing and domain resolution concepts. The network 302 may comprise wired, wireless, or a combination of wired and wireless data links.

The client 301, the DNS Server 303, the endpoint A 304, and the endpoint B 305 may be computing devices such as the computing device 200, or any other such computing device. For example, the client 301 may be a personal computer, a smartphone, a laptop, or the like. The DNS server 303 may be a server computer, a cloud computing resource, or an embedded device, for example. The endpoints A 304 and B 305 may be, for example, web sites, Internet resources, content servers, load balancers, proxies, streaming video servers, API endpoints, databases, or any other such network-accessible computing resource.

Figure 3B:
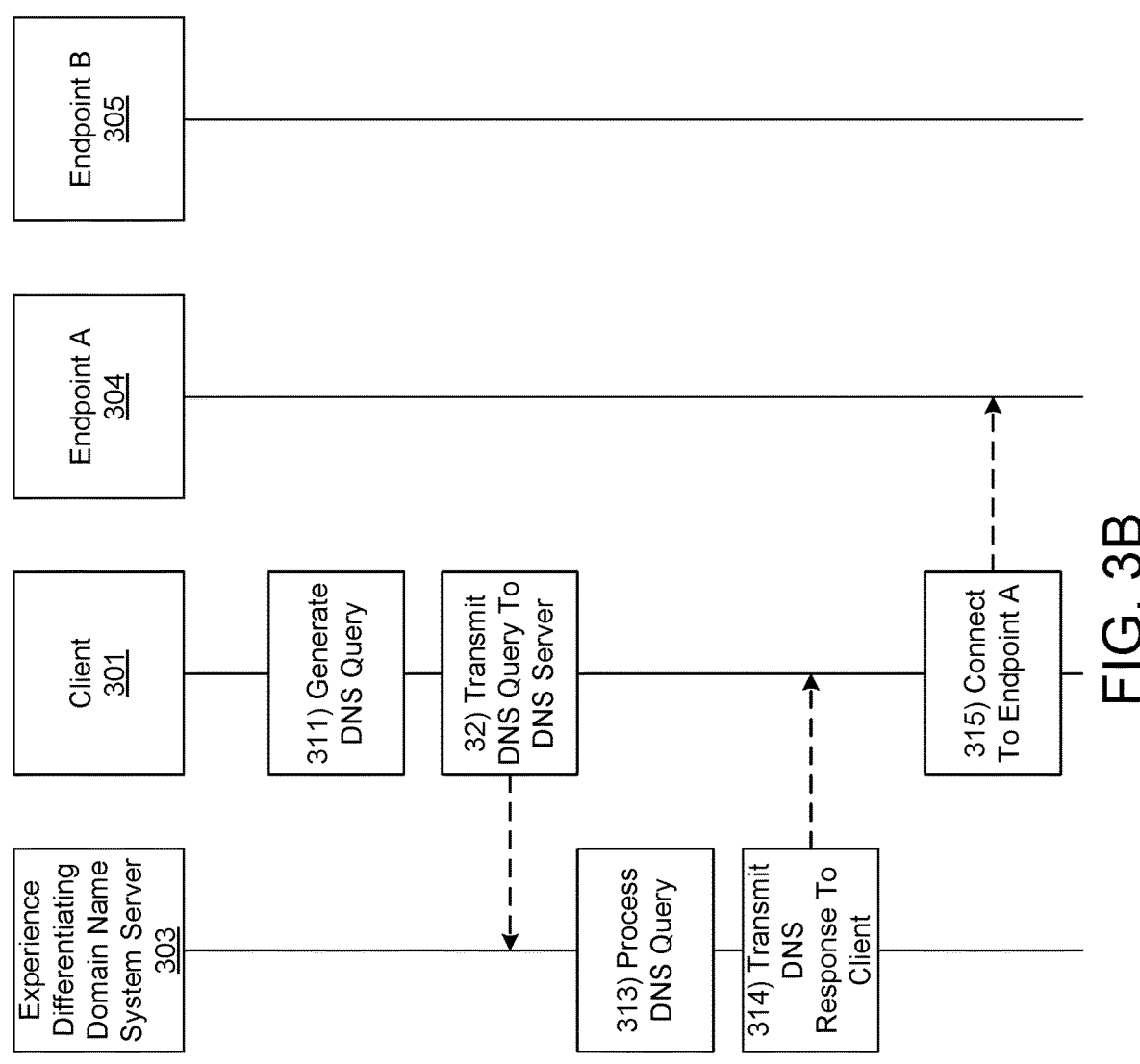
FIG. 3B shows an example state diagram of a method of operation of an experience differentiating domain name system.

Operation of an example DNS system 300 is shown in FIG. 3B. First, at step 311, client 301 may generate a DNS query. At step 312, the client 301 transmits the DNS query to the DNS server 303. The DNS server 303 may receive the DNS query and processes the query at step 313. At step 314, the DNS server 303 may transmit the DNS response to the client 301. The client 301 may receive the DNS response at step 315 and connect to the endpoint indicated in the response, for example the endpoint A 304. Each step is described in detail below.

Figure 3D:
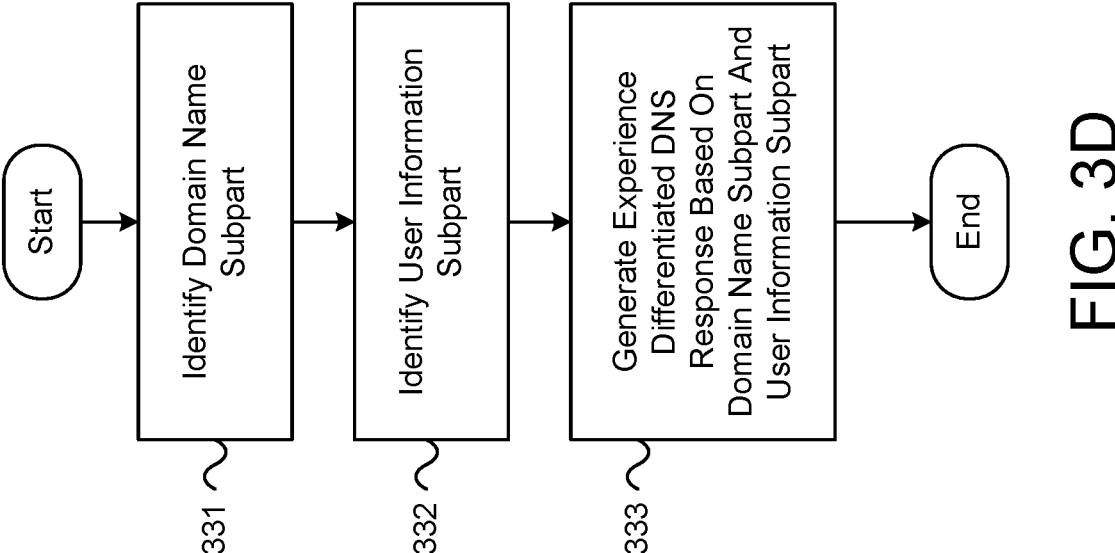
FIGS. 3C-3D show example methods of operation of an experience differentiating domain name system.
Figure 3C:
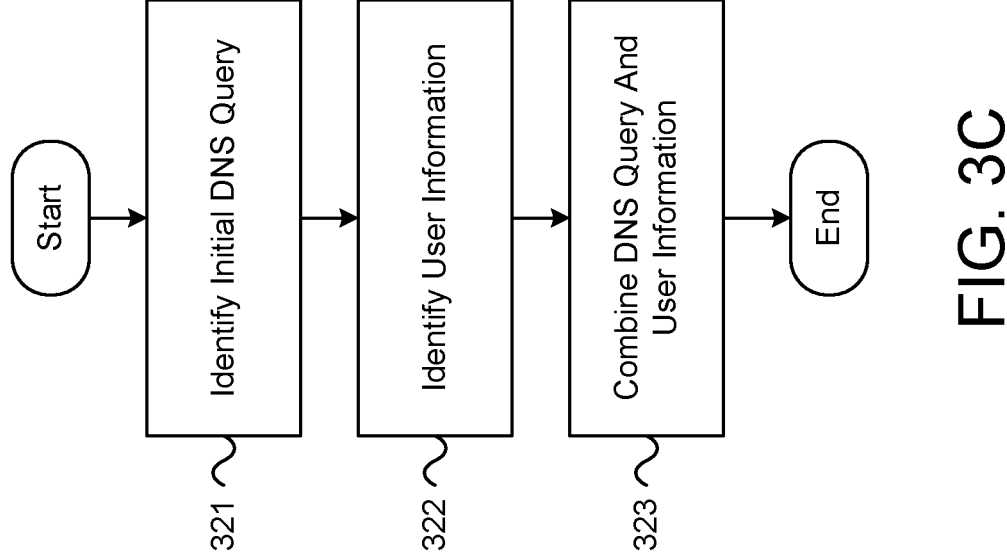

At step 311, the client 301 may generate a DNS query. An example flow diagram of generating a DNS query is shown in FIG. 3C. At step 321, the client may identify an initial DNS query. The initial DNS query may comprise at least a domain name, such as "example.com," and a requested RR such as an "A" record that indicates a request for an IPv4 address for "example.com." An experience differentiating DNS query, or simply referred to herein as a DNS query, is a DNS query that contains additional user information to identify the querying the client 301 to the DNS Server 303. At step 322, the client may identify the user's information to be included in the DNS query. For example, one type of user information may be a username. Other examples of user information include but are not limited to geographic region, customer type, customer number, account number, a service level or class associated with a customer, or any such similar information and/or combination thereof.

At step 323, the client may form a DNS query by combining the domain information identified in step 321 and the user information identified in step 323. The user information may be combined with the domain name in several ways. For example, the user information may be prepended to the domain name in the DNS query. For example, rather than "example.com," a DNS query may include a request for "username.example.com." The DNS query may be formatted so the "username" portion may be prepended to the domain name "example.com" the same way that a subdomain is. The user information may be combined with a domain name by, for example, appending user information to the domain name with a known connecting character, such as "u sername-example. com."

The user information portion of the query may include a special set of characters either prepended, appended, or both prepended and appended to the user information to identify it as user information. For example, if the username is "User123," a convention may be established between the DNS server and client that a special character or sequence of characters be prepended to the username to identify it, such as "user-User123" and a resultant fully qualified domain name of "user-User123.example.com." By agreement or convention between the DNS server 303 and the DNS client 301, any mutually agreed upon character or character sequence may designate user information from subdomains. At step 312, the client 301 may transmit the DNS query to the DNS server 303.

Returning to FIG. 3B, at step 313 the DNS server 303 may receive the DNS query and processes the query. The DNS server 303 may not process the user information portion of the query as a subdomain. Rather, the DNS server 303 may recognize the user information portion of the DNS query as user information intended to differentiate a user experience by reversing the process described above that the DNS client 301 performs to identify user information in the DNS query. A method of processing DNS queries is shown in FIG. 3D. At step 331, the server may identify the domain name subpart of the DNS query, and at step 332, the server may identify the user information subpart of the DNS query. The server may perform a complimentary function to the method the client used to combine the domain name subpart and the user information subpart in step 323. For example, based on the server 303 receiving a request with a subdomain that begins with specific prefix (e.g., "user-"), the subdomain may be treated as user information. In this example, to extract the user information from the query, the server 303 may remove the special identifier string (in this case "user-"), leaving the user information (in this case, "User123"). User information may be integrated into the DNS query in many ways. For example, a client may format the DNS query as "userinformation-example.com" or any other such combination. The client and server may be configured to a common method or methods so both the domain name subpart and the user information subpart of the DNS query may be communicated from the client 301 to the server 303 in step 312.

The DNS server 303 may identify user information in a DNS query using heuristics or by convention. For example, the DNS server 303 may follow a convention to treat all second level subdomains as user information. In this example, the format of DNS queries may be "userinformation.subdomain.example.com." Thus, special identifying characters may not be necessary to identify user information in a DNS query. The DNS server may identify user information by examining sub-domain requests. The DNS server may initially attempt to resolve a sub-domain in the manner a sub-domain is resolved, and if no matching sub-domain is in the DNS record for that domain, then treat the sub-domain as encrypted user information.

At step 333, the DNS Server 303 may, based on the user information from the DNS query, perform a differentiating function based on the user information identified at step 332 and the domain name subpart identified at step 332. Returning to FIG. 3B, the DNS server may transmit the DNS response to the client 301 at step 314. At step 315, the DNS client receives the DNS response and connects to the endpoint indicated therein. In this example, the DNS response may have differentiated the client 301 to be directed to the endpoint A 304. For a different client, the DNS may direct a client to the endpoint B 305 for a similar DNS query. Additional details regarding the differentiating function of step 333 are explained below.

A differentiating function may be any function that takes user information as input and provides user supplemental address information as output. User supplemental address information may be any information that indicates a desired and/or intended differentiation for a user. An example of user supplemental address information may be an indication of a service tier offering such as "premium" or "standard." In this example, the differentiating function may receive a username such as "User123" and return "premium" to indicate that the user associated with username "User123" is subscribed to a "premium" service tier and should receive a corresponding user experience. Another user, in this example, may be associated with username "User456" and be subscribed to the "standard" service tier, and the differentiating function returns "standard" for "User456." Thus, the differentiating function may receive user information and return user supplemental address information used to differentiate the user experience for clients.

Figure 4B:
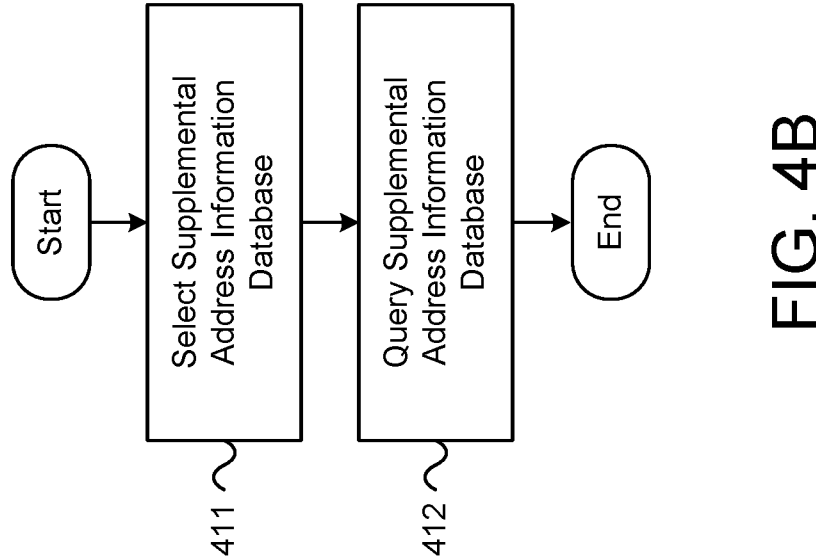
FIGS. 4A-4B show example flow diagrams of methods of operation of an example experience differentiating domain name system server.
Figure 4A:
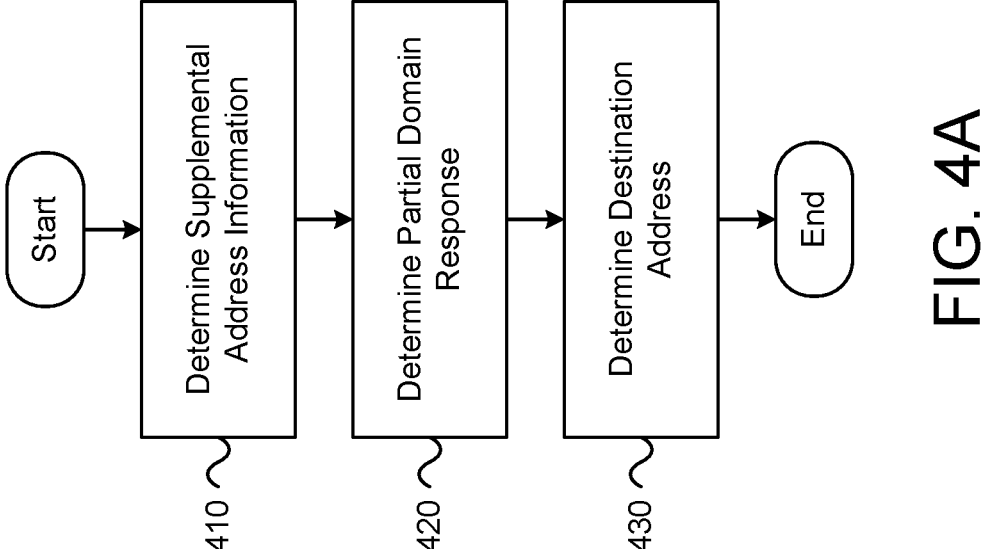

FIG. 4A is an example method to generate experience differentiated DNS response based on a domain name subpart and user information subpart. At step 410 of FIG. 4A, supplemental address information may be determined based on user information. At step 420, a partial domain response may be determined based on the domain in the DNS query. At step 430, the partial domain response and supplemental address information may be combined to determine a responsive destination address to return to the DNS client.

A differentiating function may be any algorithm that inputs user information and returns related supplemental address information. For example, a differentiating function may be locally implemented and/or remotely implemented and made available to the DNS server as a service or API. An example differentiating function may be a load-balancing function that distributes the load of many users over a finite number of endpoints. For example, one approach to load balancing may be to assign endpoints randomly to users. The load balancing differentiating function may then maintain a record of the assigned endpoint for each user so later DNS lookups by that user yield the same endpoint to maintain experience continuity between sessions. Other methods of load balancing may also be similarly implemented by way of a differentiating function.

A differentiating function may algorithmically associate user information with some other supplemental address information for that user. For example, user information may be a geographic indicator such as a state identifier such as "IL" for Illinois. In this example, a differentiating function may associate state identifiers with supplemental address information that identifies a time zone, such as "Central" for "IL." Thus, if a client is configured to provide user information in a state identifier, the differentiating function may be configured to differentiate user experience not by state but by time zone.

Supplemental address information may be determined at step 410 by executing the method shown in FIG. 4B and querying a database containing user information and related supplemental address information. At step 411 of FIG. 4B, a supplemental address information database may be selected. If the supplemental address information database is associated with a domain, it may be located and identified. If the supplemental address information database is local to the DNS server, it may be located and identified. At step 412, the identified database may be queried to determine supplemental address information based on user information.

The database may be local to the DNS server or remote from it. The database may associated with a particular endpoint. For example, a differentiating function may be associated with a domain name. For example, the "example.com" domain may provide a differentiating function database that contains user information for example.com customers and supplemental address information for those customers. The differentiating function database may be provided by another entity or a third party. For example, a differentiating function database may be made accessible to the DNS server as a service endpoint accessible via a network. The differentiating function database may additionally or alternatively be unassociated with any particular endpoint or domain, being usable with any endpoint or any of a set of endpoints. DNS Returning to FIG. 4A, at step 420, the DNS Server determines a partial domain name response based on the domain name subpart of the DNS query by querying a partial domain response database. A partial domain name response may be a collection of zone files for the domain, and a partial domain response database may be a database of zone files. For example, a partial domain name response for "example.com" may be a plurality of DNS zone files, each associated with an identifier. Each of the plurality of DNS zone files may comprise an alternative, complete zone for the domain. Each DNS zone file may include different RRs that point to different IP addresses for the same record. For example, a first DNS zone file may include an "A" record with an IPv4 address of "192.0.2.3," and a second DNS zone file may include an "A" record with an IPv4 address of "192.0.2.4." These two DNS zone files may provide different responses to the same DNS queries, so selecting between one of them to run a DNS query on may produce different DNS results. Each DNS zone file of the partial domain name response may be associated with an identifier that corresponds to the supplemental address information determined by the differentiating function discussed above.

For example, the first DNS zone file may be associated with the supplemental address information "central" to indicate that is the proper zone file to use for clients in the central time zone, and the second DNS zone file may be associated with the supplemental address information "eastern" to indicate it is the appropriate zone file for clients in the eastern time zone. A DNS zone file may be associated with a "premium" service tier and an alternate DNS zone file may be associated with a "standard" service tier. The DNS server may maintain a plurality of DNS zone files for each domain it services, each DNS zone file associated with a plurality of identifiers corresponding to supplemental address information. By convention or agreement, the supplemental address information provided by the differentiating function may correlate with the identifiers of DNS zone files stored in a partial domain response database.

The partial domain response database may include single RRs or an incomplete collection of RRs associated with identifiers rather than a complete zone file. Rather than using an entirely different zone file for each differentiation, the DNS server may use a single RR or collection of RRs combined with a reference or default zone file for a domain. For example, the partial domain name response may comprise four "A" record RRs with differing IPv4 addresses for a domain. When processing a DNS query, the DNS server may use the "A" record identified by the differentiating function, but use a default "MX" record for all DNS queries. Thus, the DNS server may reduce storage redundancy between alternative zone files and ensure complete DNS records for all users regardless of differentiation.

At step 430, the partial domain response and supplemental address information are combined to determine a responsive destination address to return to the DNS client. At this step, the supplemental address information may be combined with the partial domain response to determine responsive DNS records. For example, if the partial domain response is a collection of zone files, one of the collection of zone files may be selected based on the supplemental address information and chosen to respond to the DNS query. In the example above, zone files are associated with an identifier that corresponds to supplemental address information, and the supplemental address information may be matched with one of the zone files. Based on determining a zone file, the DNS server may process the DNS query from the selected zone file.

Figure 5:
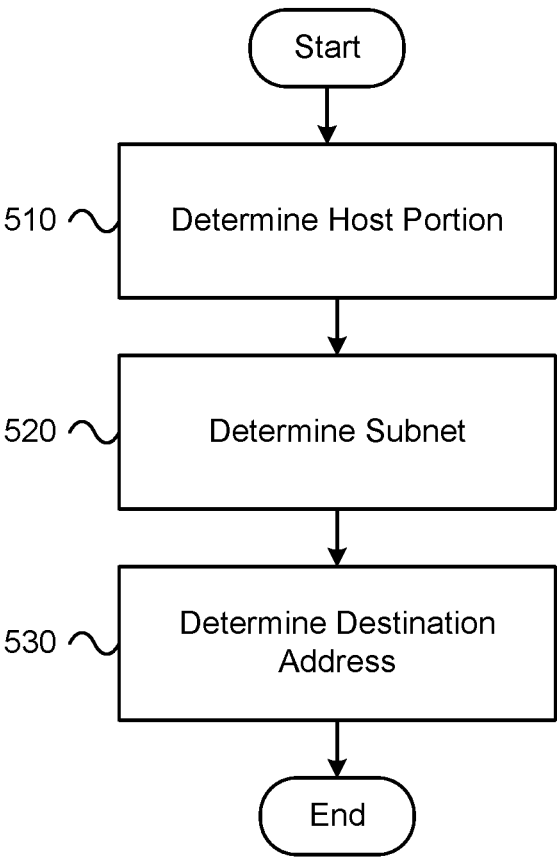
FIG. 5 shows an example flow diagram of a method of operation of an example experience differentiating domain name system server.

As shown in FIG. 5, a partial domain response may comprise an identification of an IP subnet and the partial domain response database may include identifications of IP subnets. In this example, supplemental address information may be in the form of a host portion of an IP address. An IP subnet may define a set or group of IP addresses. One way to denote an IP subnet may be classless inter-domain routing (CIDR) notation. For example, CIDR IPv4 blocks are commonly notated as an IP address followed by a "/" and then a number indicating the number of masking bits to apply to the base address. For example, the CIDR subnet block 198.51.100.0/24 may denote the block of 256 addresses between 198.51.100.0 and 198.51.100.255. A higher number of masking bits may denote a smaller number of addresses in the block, and vice versa. Therefore, a CIDR subnet block 198.51.100.0/31 may denote the block of two addresses of 198.51.100.0 and 198.51.100.1. Similarly, a CIDR block 198.51.100.0/30 may denote the block of four addresses between 198.51.100.0 and 198.51.100.3, and so on. Thus, CIDR notation is a convenient method of representing contiguous blocks of IP addresses.

A subnet therefore describes a range of addresses by defining a portion of an IP address, which may be referred to as a routing prefix. In the example above, the routing prefix of the 198.51.100.0/24 block is the first 24 bits (or three octets in dotted decimal format) of 198.51.100.0, or simply 198.51.100. The remainder of the addressable bits, in this case 8, may be referred to as a host portion. The host portion may identify a particular address within the block by providing the remainder of the address. In the example above, a host portion for the 198.51.100.0/24 subnet would comprise the remaining 8 bits of the 32 bit address. In dotted decimal format then, the host portion would be the final number in an IP address. Combining a routing prefix (as designated by subnet notation) and a host portion is referred to as subnet masking.

In FIG. 5, at step 510 supplemental address information in the form of a host portion of an IP address may be determined. Supplemental address information may be determined by database lookup or algorithmically. At step 520, an IP subnet or routing prefix may be determined. For example, at step 520, an IP subnet may be determined by querying a partial domain response database. At step 530, a destination address may be determined responsive to the DNS query by combining the subnet and host portion through subnet masking to produce an IP address. For example, the supplemental address information may comprise a host portion that that indicates a particular address in a subnet. In the example 198.51.100.0/24 subnet above, a corresponding host portion may be, for example "0.0.0.7." Combining a subnet and a host portion through subnet masking produces a single resulting IP destination address of 198.51.100.7. Thus, a differentiating function may provide supplemental address information that comprises a portion of an IP address that, when combined with a subdomain partial domain response through subnet masking, yields a specific IP address. If supplemental address information for a different client was, for example, "0.0.0.8," then the resultant destination address would be 198.51.100.8, and the different client would be directed to a different endpoint connected to the network. Thus, different clients may be routed to different endpoints connected to a network that may provide different experiences.

The DNS server receives and processes DNS queries from DNS clients. A DNS client may be any computing device configured to combine user information with DNS queries to form DNS queries. As an example, one type of user information may be a username. Other examples of user information may include but are not limited to geographic region, customer type, customer number, account number, a service level or class associated with a customer, or any such similar information and/or combination thereof.

The DNS client may generate the DNS query using the method discussed with respect to FIG. 3C, for example. The user information subpart may be combined with a DNS query at any stage in the DNS querying process. For example, the functionality to include user information in DNS queries may be integrated in a DNS client application or library. This approach may ensure that every DNS query issued by a client comprises user information. User information may be included in DNS queries at a higher level in the software stack on a client, such as at an application level. For example, an application, such as a web browser add-on, may be configured so all DNS queries issued by it are DNS queries and include user information.

A web site may be configured to use DNS query rewriting. A particular web site may be configured to append user information to links by either server-side processing or client-side processing. For example, a JavaScript script may be included on a web page that prepends user information to all or a subset of URLs on a web page.

URLs may be stored and/or cached when a DNS lookup takes place. A client, such as a web browser may connect to a DNS server to translate a URL into an IP address. Between the client and the source DNS server, other systems may cache DNS record values for a period of time. For example, operating systems, local routers, and DNS resolvers operated by ISPs may cache or store DNS requests. Any identifying information in the URL requested may therefore potentially be stored in any of these places. Leaving such personally identifiable information in plaintext while at rest on intermediary systems may pose a risk to user's privacy. To preserve the user's privacy the user information may be encrypted by the client so any caching in the DNS system may only contain encrypted information. An interstitial party without a proper decryption key then could not read the identifying information otherwise stored in plaintext. The encrypted information may be decrypted at the DNS server to recover the user information used to differentiate user experiences.

The DNS server and DNS client may use a static, predetermined encryption key to encrypt user information at the client and decrypt it at the server. The static, pre-determined encryption key may be pre-shared from server to client to facilitate key exchange. Similarly, the DNS server and/or the DNS client may encrypt the domain name or other similar information both in transit and at rest (e.g., in browser history files).

The DNS client may use a one-way cryptographic hash to obfuscate user information prior to sending it to the DNS server. Examples of one-way cryptographic hashes include MD5, SHA-1, SHA-2, or the like. While the server cannot recover the original user information in plaintext from the hashed user information, it may serve as a unique identifier for some applications.

The DNS system may use features of DNS and public key cryptography to exchange and synchronize encryption keys between the server and clients. Public key cryptography is a category of cryptographic methods to exchange encryption keys between two parties so an interloper who observes the encryption key exchange cannot decrypt the message. This is, for example, the same category of algorithms used by web browsers to encrypt websites via the HTTPS protocol.

Figure 6:
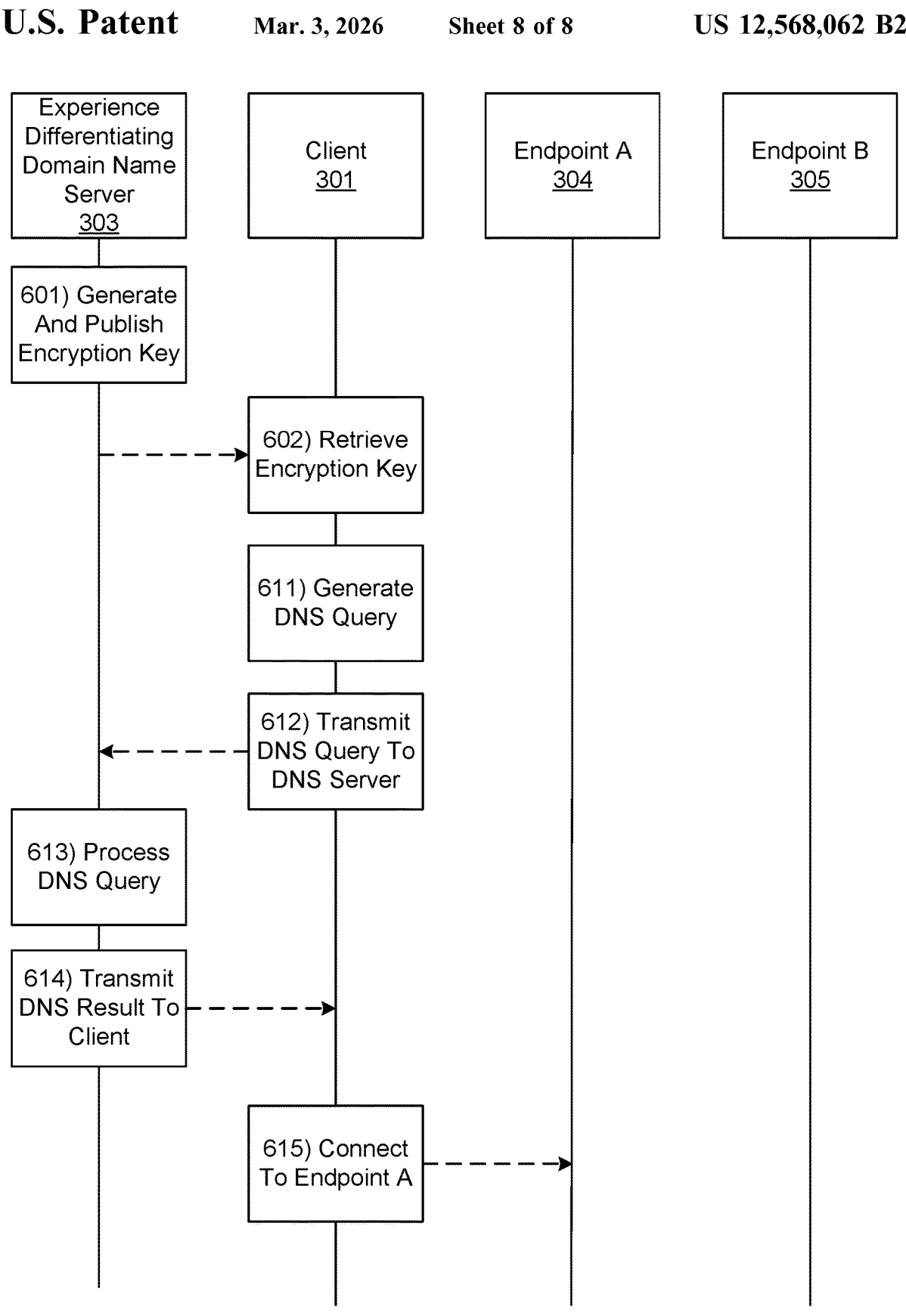
FIG. 6 shows an example state diagram of a method of operation of an experience differentiating domain name system.

As depicted in FIG. 6, the DNS server 303 may first generate a public encryption key and may make it publicly available at step 601. The DNS server may make the public key available via a DNS TXT record. The DNS TXT record type may be defined by the DNS standards as a way to store and make available arbitrary string attributes. The DNS server may use the encryption TXT record to store a public encryption key and remain compatible with other DNS systems. Any other parameters required to encrypt the identifying information may also be provided in a TXT record, such as an identification of the encryption algorithm to use and any parameters for the encryption process. For example, a TXT record may include an encryption key, specify to use a particular encryption algorithm, and specify any necessary parameters to apply that encryption algorithm to data. The DNS TXT record may be identified through a known name identifier to announce its availability. A client may check for the known name identifier to determine if the DNS server is compatible with a DNS query. For example, the name of the DNS TXT record containing an encryption key may be "DNS_KEY" or something similarly identifiable.

At step 602, a DNS client may retrieve the DNS TXT record containing the public key and other parameters by requesting the DNS TXT record from the DNS server. The DNS client may encrypt user information with the public encryption key and according to the algorithm and parameters specified by the encryption TXT record at step 611. The DNS client may then generate a DNS query in step 611 similar to the process described in step 311 of FIG. 3B, using encrypted user information rather than plain text user information. At step 612, the client transmits the query to the server in a manner similar to step 312 of FIG. 3B.

The DNS server may then receive the request at step 613 and decrypt the user information using the public encryption key previously provided in the encryption TXT record. Once the DNS server decrypts the user information, it may be processed in a similar way as described above for non-encrypted user information. The server may transmit the DNS response to the client at step 614, and the client may connect to the appropriate endpoint at step 615.

The DNS server regularly rotates encryption keys so the encrypted payload changes over time even if the same user information is encrypted. Any cached encrypted user information may be more difficult to associate with a particular user. For example, if a username is encrypted with the same encryption keys multiple times, the resultant encrypted username may remain constant. While the contents of the encrypted username may remain unavailable to any third party, a user may nonetheless be tracked through associating the encrypted username through multiple channels. For example, two DNS queries from two different locations comprising the same encrypted username as user information may be sufficient to suggest to a third party that the same user originated both queries. This association in itself may comprise a security breach.

DNS RRs may include a time to live (TTL) value. The TTL value specifies how long the RR may be valid. When a DNS client receives a RR from a DNS server, the client may reliably re-use the response for the period defined by the TTL value. For example, if a client receives an RR with a TTL of 60 seconds, the client may cache the RR for 60 seconds and not check the DNS server for a new value until the 60 seconds has elapsed. The DNS system may allow servers to control how long clients cache responses. The DNS server may set an arbitrarily low static TTL value, for example one second, to effectively limit caching of the encryption TXT record. Any query for the encryption TXT record containing the public encryption key may be current and in-sync with the server.

The DNS server may keep an internal TTL value for the encryption TXT record and dynamically return that value when the encryption TXT record is requested. For example, if the internal TTL value is one minute, or 60 seconds, and the DNS Server receives a request when the internal TTL value is at 45 seconds, the DNS Server may return 45 seconds as the encryption TXT RR TTL. An identical request 30 seconds later may return a TTL value of 15 seconds. At the expiration of the internal TTL value, a new public and private key may be generated by the DNS server and the encryption TXT record may be updated. Any cached versions of the encryption TXT record, may be synchronously invalidated because of the dynamically issued TTL values. Clients may receive the new TXT record and re-encrypt the user information. Thus, the DNS server may leverage existing DNS infrastructure to maintain synchronization of public keys while still allowing clients and intermediaries to cache the record.

The DNS server may employ a static TTL value for the encryption TXT record. The static TTL value may be set to one-half of the internal public key TTL value. For example, if the encryption TXT record TTL is set to 60 seconds, the public key TTL may be set to 120 seconds. The DNS server may continue to generate and publish new public keys every 60 seconds. The DNS server may maintain two valid public keys. Any encrypted user information received at the server in that time could be encrypted using either one of the two valid public keys. When the server receives an encrypted user information subpart, there may be ambiguity as to which of the two presently valid encryption keys it was encrypted with. The DNS server may try both valid public keys to determine which one successfully decrypts the user information payload.

The encryption key published by the server may include an identifier. The identifier may be associated with the encryption key and may be received by the client. The client may then include the identifier with the encrypted user information in a DNS query. For example, the DNS query may contain an encryption key identifier subpart, or the identifier may be included in the encrypted user information subpart. The server may, based on receiving an encryption key identifier, associate the query with an appropriate encryption key and perform the decryption using that key. In the example above, where two public keys are valid at any moment, a single binary value may distinguish between the two valid keys at any moment. TTL timing may not need to be synchronized between client and server, and the server need not guess and check to determine which of the valid encryption keys to use to decrypt the encrypted user information.

Features of the disclosure have been described in terms of examples. While example systems, apparatuses, and methods embodying various features of the present disclosure are shown, it will be understood that the disclosure is not limited to these examples or features. Modifications may be made. Each of the features of the aforementioned examples may be utilized alone or in combination or sub-combination with elements of other examples. Any of the above described systems and methods or parts thereof may be combined with the other methods and systems or parts thereof described above. The steps shown in the figures may be performed in other than the recited order, and one or more steps shown may be optional. These and other modifications may be made without departing from the spirit and scope of the present disclosure. The description and drawings are thus to be regarded as examples instead of restrictive on the present disclosure.

What is claimed is:

1. A method comprising:

decrypting, by a domain name service (DNS) system in order to obtain a decrypted first subpart, an encrypted first subpart of a uniform resource identifier (URI) of a DNS query from a user device;

determining, based on the decrypted first subpart, supplemental address information associated with a user that is different from the URI and the DNS query;

based on the supplemental address information and a second subpart of the URI, determining a destination address for a response to the DNS query; and sending, to the user device, the response to the DNS query that comprises the determined destination address.

2. The method of claim 1, wherein determining the supplemental address information is based on a query, to a database, using the decrypted first subpart.

3. The method of claim 1, wherein the encrypted first subpart of the URI is encrypted with a published key after the published key is made available by the DNS system.

4. The method of claim 1, wherein the decrypting comprises decrypting the encrypted first subpart based on a published key that comprises at least one of:

a decryption key, associated with the DNS system, that is valid for a predetermined period of time and invalid after the predetermined period of time has elapsed, a decryption key made available by the DNS system via a first DNS resource record (RR), or a decryption key having a validity period corresponding to a time to live (TTL) value of a second DNS RR.

5. The method of claim 1, wherein the decrypted first subpart comprises one or more of:

a username associated with the user device, a geographic region associated with the user device, a customer type associated with the user device, a customer number associated with the user device, an account number associated with the user device, or a service level associated with the user device.

6. The method of claim 1, wherein the determining the destination address comprises:

selecting one of a plurality of DNS zone files based on the supplemental address information.

7. The method of claim 1, wherein the decrypted first subpart comprises an identification of an Internet Protocol (IP) subnet, and wherein the supplemental address information comprises a host part of an IP address.

8. An apparatus comprising:

one or more processors; and memory storing instructions that, when executed by the one or more processors, configure the apparatus to:

decrypt, in order to obtain a decrypted first subpart, an encrypted first subpart of a uniform resource identifier (URI) of a domain name service (DNS) query from a user device;

determine, based on the decrypted first subpart, supplemental address information associated with a user that is different from the URI and the DNS query;

based on the supplemental address information and a second subpart of the URI, determine a destination address for a response to the DNS query; and send, to the user device, the response to the DNS query that comprises the determined destination address.

9. The apparatus of claim 8, wherein the instructions, when executed by the one or more processors, configure the apparatus to determine the supplemental address information further based on a query, to a database, using the decrypted first subpart.

10. The apparatus of claim 8, wherein the encrypted first subpart of the URI is encrypted with a published key after the published key is made available by the apparatus.

11. The apparatus of claim 8, wherein the instructions, when executed by the one or more processors, configure the apparatus to decrypt the encrypted first subpart based on a published key that comprises at least one of:

a decryption key, associated with the apparatus, that is valid for a predetermined period of time and invalid after the predetermined period of time has elapsed, a decryption key made available by the apparatus via a first DNS resource record (RR), or a decryption key having a validity period corresponding to a time to live (TTL) value of a second DNS RR.

12. The apparatus of claim 8, wherein the decrypted first subpart comprises one or more of:

a username associated with the user device, a geographic region associated with the user device, a customer type associated with the user device, a customer number associated with the user device, an account number associated with the user device, or a service level associated with the user device.

13. The apparatus of claim 8, wherein the instructions, when executed by the one or more processors, configure the apparatus to determine the destination address by:

selecting one of a plurality of DNS zone files based on the supplemental address information.

14. The apparatus of claim 8, wherein the decrypted first subpart comprises an identification of an Internet Protocol (IP) subnet, and wherein the supplemental address information comprises a host part of an IP address.

15. One or more non-transitory computer readable media storing instructions that, when executed, cause:

decrypting, by a domain name service (DNS) system in order to obtain a decrypted first subpart, an encrypted first subpart of a uniform resource identifier (URI) of a DNS query from a user device;

determining, based on the decrypted first subpart, supplemental address information associated with a user that is different from the URI and the DNS query;

based on the supplemental address information and a second subpart of the URI, determining a destination address for a response to the DNS query; and sending, to the user device, the response to the DNS query that comprises the determined destination address.

16. The one or more non-transitory computer readable media of claim 15, wherein the instructions, when executed, cause the determining the supplemental address information further based on a query, to a database, using the decrypted first subpart.

17. The one or more non-transitory computer readable media of claim 15, wherein the encrypted first subpart of the URI is encrypted with a published key after the published key is made available by the DNS system.

18. The one or more non-transitory computer readable media of claim 15, wherein the decrypting comprises decrypting the encrypted first subpart based on a published key that comprises at least one of:

a decryption key, associated with the DNS system, that is valid for a predetermined period of time and invalid after the predetermined period of time has elapsed, a decryption key made available by the DNS system via a first DNS resource record (RR), or a decryption key having a validity period corresponding to a time to live (TTL) value of a second DNS RR.

19. The one or more non-transitory computer readable media of claim 15, wherein the decrypted first subpart comprises one or more of:

a username associated with the user device, a geographic region associated with the user device, a customer type associated with the user device, a customer number associated with the user device, an account number associated with the user device, or a service level associated with the user device.

20. The one or more non-transitory computer readable media of claim 15, wherein the determining the destination address comprises:

selecting one of a plurality of DNS zone files based on the supplemental address information.

21. The one or more non-transitory computer readable media of claim 15, wherein the decrypted first subpart comprises an identification of an Internet Protocol (IP) subnet, and wherein the supplemental address information comprises a host part of an IP address.

* * * * *